April 8, 1969

J. E. POHL
3,437,894
MULTIPLE SPEED SERVOMECHANISM DRIVE SYSTEM FOR POSITIONING AN ANTENNA IN DIRECT RESPONSE TO DIGITAL SIGNALS
Filed March 29, 1966

INVENTOR.
JAMES E. POHL
BY
AGENT

ATTORNEYS

United States Patent Office 3,437,894
Patented Apr. 8, 1969

3,437,894
MULTIPLE SPEED SERVOMECHANISM DRIVE SYSTEM FOR POSITIONING AN ANTENNA IN DIRECT RESPONSE TO DIGITAL SIGNALS
James E. Pohl, San Diego, Calif., assignor to the United States of America as represented by the Secretary of the Navy
Filed Mar. 29, 1966, Ser. No. 538,928
Int. Cl. H02p 7/36
U.S. Cl. 318—18                                     4 Claims

ABSTRACT OF THE DISCLOSURE

The instant disclosure relates to electronic systems for controlling servomechanism motors coupled to antenna systems that are responsive to digital signals. The disclosed invention provides drive rate signals to a servomechanism in response to digital data signals without necessitating the conversion of the digital data signals into analog signals. Due to an intricate electronic system passing comparison signals to a pair of equality detectors, one giving an output signal when the actual position of the servomechanism is greater than a predetermined angular deviation, and the other giving an output signal when the actual position of the servomechanism is less than the angular deviation, the electronic circuit drives the servomechanism at varying speeds in direct response to digital signals representative of the difference between an antenna's actual direction and the direction that the antenna should point to without the conversion to analog signals.

---

The invention described herein may be manufactured and used by or for the Government of the United States of America for governmental purposes without the payment of any royalties hereon or therefor.

Control systems utilizing servomechanism drive devices have multitudinous uses in the mechanical and electrical arts today. In most instances such servomechanisms are used to change the position of an object in response to some new desired position for such object to occupy. In controlling the movement of the servomechanism to such a new desired position it is naturally desirable to direct its operation in such a manner that the new position is reached by way of the most direct path and in the shortest possible time. In achieving such a result, it is necessary to determine the direction of movement so that the shortest possible path is taken to the new desired position and furthermore, to determine the speed at which the servomechanism should be driven to reach its desired position in the shortest time and yet still be able to stop when such desired position is reached, i.e., without overshoot. A suitable system for determining the direction of movement is disclosed by the co-pending U.S. patent application of James E. Pohl, Ser. No. 498,171, filed Oct. 19, 1965. This invention pertains to an arrangement for determining the speed of movement, or drive rate, of a servomechanism.

The usual manner proposed by the prior art for determining drive rate involves a system which operates solely on analog computations. For example, an analog signal representative of the actual position of the servomechanism is compared with another analog signal representative of the desired position of said servomechanism. The comparison results in the development of a difference signal or error signal which by its magnitude determines the drive rate of the servo. Such a system may be described as a closed loop feedback control system. If the data representing present position and desired position is in analog form such a system may be quite desirable. If, however, the data is in digital form, as is the case in many present computer-controlled systems, conversions from the digital data to analog data must be made before drive rate can be determined. It is therefore desirable to have available a system which operates directly on digital data without the necessity of conversion into analog form. Furthermore a digital computation arrangement allows the input data to be supplied directly in a numeric format without necessitating the conversion of such numeric information into analog voltage levels.

Another advantage of a digital computation system is the fact that drift and variations in voltage levels is more tolerable than is an analog arrangement.

It is therefore an object of this invention to provide a digital servomechanism positioning system.

A further object of this invention is to provide an arrangement for determining the drive rate of a servomechanism by digital techniques.

A more particular object of this invention is to provide a servo drive rate determining system which operates directly on numeric, or digital, data without necessitating conversion to analog data.

A still further object of this invention is to provide a servo control system which drives a servomechanism at a high speed until the actual position of the servo approaches the desired position of same and thereafter reduces the drive speed in proportion to the remaining difference between the actual and the desired positions, until the two are equal.

In accordance with this invention it is assumed that two sources of digital signals are available, one representative of the actual position of a driven member of a servomechanism and the other representative of a desired position of such driven member. Also provided is a predetermined maximum number of digital counts which are compatible with the digital signals representative of position, i.e., they have the same dimensional units. Means are then provided for producing an increased digital signal by adding a determinable number of the digital counts to the actual position signal and producing a decreased digital signal by subtracting a determinable number of the digital counts from said actual position signal. Two resultant signals are therefore available, one having an increased digital value and the other a decreased value. The increased and decreased signals are thereafter compared in an equality detecting means with digital signals from the source representative of the desired position. When equality is detected between either of the pairs of signals an output is provided which stops the source of digital counts. The value of the stopped digital count is then supplied to a drive rate generator which is adapted to supply any one of a plurality of drive rate signals to the servomechanism. If the stopped digital count equals the predetermined maximum number of digital counts available from the count source then the greatest drive rate signal is supplied to the servomechanism. If, however, the stopped digital count is less than the predetermined maximum number of counts, a lesser drive rate signal is supplied to the servo. This results in the servo being driven at a maximum rate when the actual and desired positions differ by an amount greater than a predetermined maximum and at a lesser rate when the positions differ by a lesser amount.

The above objects and features of this invention will be better understood from the following detailed description and appended claims taken in conjunction with the attached drawings wherein:

Figure 1:
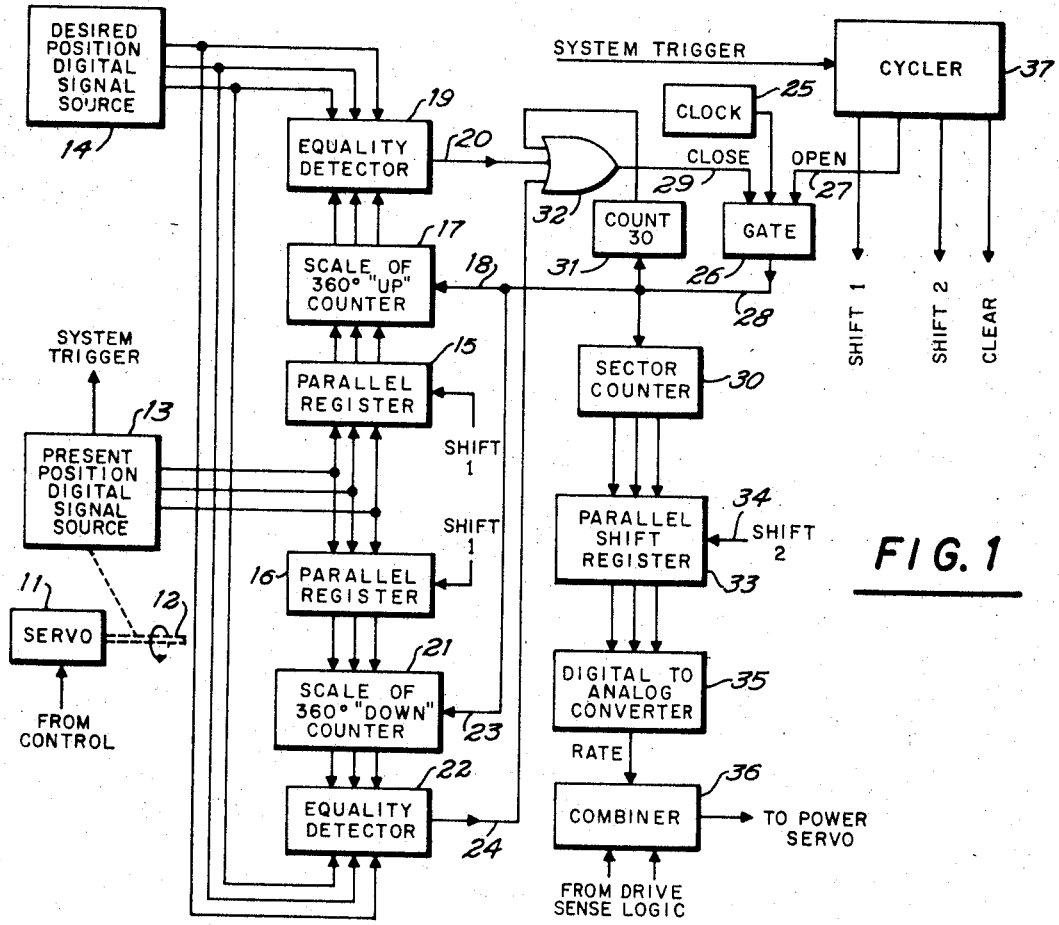
FIG. 1 is a block diagram of an embodiment of the present invention.

For purposes of simplicity and ease in understanding the embodiment of the invention shown in FIG. 1 represents a system used to control a servo of the rotational variety. Consequently servo 11 shown to have a shaft 12, or driven member, which is capable of angular rotation. It should be understood however that this invention is not limited to rotational type servomechanisms and could readily adapt to those of the rectilinear variety.

As shown in FIG. 1 a source 13 of present position digital signals is mechanically coupled to servo shaft 12. Source 13 would typically be some sort of shaft position encoder which senses the position of shaft 12 and products a digital signal representative of such position. Source 13 senses the shaft position periodically and consequently generates a new digital signal in a cylic manner. Each time a new signal is generated another signal it produced which is indicative of the production of said new signal. This other signal is labelled the "system trigger" in this application and in effect informs the system that a new signal is available, for computation, from source 13. It may be noted that source 13 is shown as having three output lines. The three lines are used to show that the numeric data coming from the source represents units tens and hundreds. The three line rotation is used throughout the description of the system to connote the same meaning.

Digital data representative of the desired position of shaft 12 is supplied by source 14. Source 14 could be the output of a digital computer, a punch tape reader or some manual device for generating a digital signal.

The digital present position information is supplied to a pair of parallel shift registers 15 and 16. Each of the registers is identical and operates to store any data supplied to its input until a shift signal is received which causes the stored data to be shifted to the output of the register. Many suitable devices for performing such an operation are presently available and consequently a detailed discussion of the register operation is not necessary for an understanding of the instant invention. Stored digital signals shifted from register 15 are received as the initial count in a scale of three hundred and sixty degrees "up" counter 17. The initial value count of counter 17 may be changed by the introduction of serial pulses on input 18. Counter 17 operates in such a manner that receipt of serial pulses on input 18 results in the initial value count being increased by an amount representative of one degree in response to the receipt of each serial pulse from input 18. Counter 17 may therefore be described as counting in an increasing or "up" direction. The output of counter 17 therefore in a digital signal having a value representative of the sum of the initial value signal from register 15 plus the number of pulses received from input 18. The output signal from counter 17 is supplied to equality detector 19 where it is compared with resired positoin digital signals from source 14. Detector 19 is a digital comparator which produces an equality or coincidence output on line 20 when the value of signals from source 14 coincides with the value of signals from "up" counter 17. If the compared signals do not have equal values no output signal will be present on line 20. Register 16, "down" counter 21 and equality detector 22 function in an identical manner as register 15, "up" counter 17 and equality detector 19 with the exception that instead of comparing an increased signal with the desired position signal, a decreased signal is produced by counter 21 in response to counts at its input 23 and such a decreased signal is compared with desired position signals in equality detector 22. An equality or coincidence output therefore appears on line 24 when the desired position digital signal equals the present position digital signal less some number of counts.

Clock 25 is a source of serial digital pulses, or counts, having a suitable pulse repetition frequency. The flow of pulses or counts from clock 25 into the system is controlled by gate 26. If a pulse is received on line 27, gate 26 is caused to assume its "open" position. In such an "open" position, counts from clock 25 are passed through gate 26 to output lead 28. Receipt of a pulse on line 29 causes the gate 26 to assume its "closed" position. In such a position counts from clock 25 are not permitted to enter the system. The counts provided on output lead 28 are the same counts used to advance counter 17 and 21. Inputs 18 and 23 are therefore connected to receive outputs from output lead 28 of the gate.

Two other counters receive the digital counts, to wit, sector counter 30 and "count 30" counter 31. Each of these counters is adapted to accumulate the number of serial digital pulses produced by clock 25 when the gate 26 is in its "open" condition. In particular, sector counter 30 produces a parallel digital output representative of the total number of serial counts it has received. Counter 31 also accumulates the serial digital pulses but is adapted to produce an output signal when the number of digital counts received equals 30. It should be noted at this point that although the particular embodiment shown uses a maximum count of 30 in counter 31, the maximum count is merely exemplary and other maximum counts could be utilized within the spirit and scope of this invention.

As can be noted from FIG. 1, the output of OR gate 32 controls the closing operation of gate 26. With its three input leads and single output the operation of OR gate 32 is conventional, i.e., if either of its three inputs is energized it will produce an output signal. Two of the OR gate inputs are connected to output leads 20 and 24, respectively, of the equality detectors. The third input lead receives the maximum count signal from counter 31. OR gate 32 will therefore have an output, and consequently close gate 26, if either coincidence detector 19 or 22 produces a coincidence output or if counter 31 produces a maximum count signal.

Parallel digital output signals from sector counter 30 are received and stored in shift register 33. Register 33 retains the signals from counter 30 until commanded to release them by a shift command at its control input 34. When such a shift command is received, register 33 transfers its accumulated digital count to a digital-to-analog converter 35. Converter 35 can be any suitable device which is adapted to generated an analog voltage at its output which is indicative of the value of digital signals at its input. It should be adapted to produce a discrete voltage for each digital signal value up to a maximum of the maximum count of counter 31. Therefore, in the particular embodiment shown, converter 35 is adapted to produce thirty different discrete analog voltages, the particular one produced being dependent on which one of thirty possible digital signal values is received at its input. It should also be noted that the value of the analog voltage output of the converter is indicative of the value of the digital input, i.e., a high value digital input produces a high voltage analog output.

The analog voltage output of converter 35 represents the drive rate at which the servomechanism to be controlled should operate. Converter 35 may therefore also be referred to as a drive rate generator. The analog drive rate signal from converter 35 is then supplied to combiner 36 where drive sense information is combined with it.

The composite drive information from combiner 36 is then impressed on servo 11 which responds accordingly. As mentioned previously a suitable arrangement for supplying drive sense signals would be that disclosed in copending application Ser. No. 498,171, filed Oct. 19, 1965.

Operation of the entire system is controlled by cycler 37 which produces a series of control pulses in response to the receipt of a system trigger pulse from the present position source 13. Cycler 37 controls the shifting of all the registers, the opening of gate 26 and the clearing of all the system components in preparation for a new computation. Clear inputs have not been shown on the various components of the system in order to simplify the drawings but it should be understood that various registers, counters, etc. would be provided with same in an actual operating embodiment. The operation of cycler 37 will be described in more detail in the following discussion of system operation.

*Operation*

Figure 2:
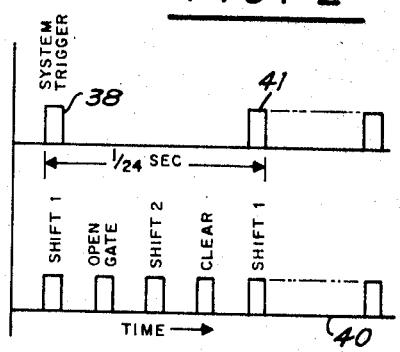
FIG. 2 is an idealized timing chart for the operation of the embodiment of FIG. 1.

Referring now to FIG. 2, the timing of the various operations performed by the system will be discussed. Under actual operating conditions source 13 will produce a digital signal indicative of present position of shaft 12. The digital signals produced by source 13 will be immediately registered in registers 15 and 16. At the same time the present position digital signal is developed, source 13 generates a system trigger pulse which provides cycler 37 with a command to initiate one cycle of operation. Pulse 38 of FIG. 2 typifies the system trigger pulse produced by source 13. Cycler 37 responds to the receipt of the system trigger pulse by producing a series of four pulses as shown on line 40 of the chart of FIG. 2. The first pulse from the cycler is a "shift 1" command which causes registers 15 and 16 to shift the digital signals representative of present position into counters 17 and 21, respectively. The next pulse from the cycler, the "open gate" pulse, causes gate 26 to open permitting clock counts to enter the system. Sufficient time is allowed between the "open gate" pulse and the next pulse from the cycler to permit clock 25 to produce at least thirty counts. Thereafter, OR gate 32 would have caused gate 26 to close, for one of three reasons, and register 34 will contain a signal indicative of the number of counts produced by the clock. The next pulse from the cycler is the "shift 2" pulse which commands register 34 to shift its recorded number of clock counts to the converter 35 with the resultant generation of an analog rate signal. Cycler 37 next produces a "clear" pulse which prepares the components of the system for another cycle. The next "system trigger" from source 13, represented by pulse 41 in FIG. 2, causes cycler 37 to repeat its operation in a similar manner.

Figure 3:
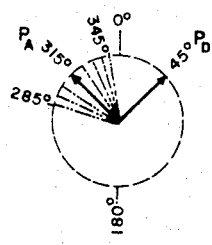
FIGS. 3 and 4 represent typical operating conditions of the system of FIG. 1.

Referring now to FIG. 3 a typical cycle of operation will be considered. Assume, for example, shaft 12 has an actual position, $P_A$ of 315°. Furthermore, assume that it is desired that shaft 12 assumes a position $P_D$ of 455°, $P_D$ denoting desired position and $P_A$ denoting actual position. Source 14 will therefore have a digital signal output representative of 45°. Source 13 will produce a digital signal 315°. The 315° signal will be stored in registers 15 and 16 and then shifted to counters 17 and 21, respectively. Both counters will therefore have an initial count of 315°. Since 315° does not coincide with the 45° signal from source 14, neither coincidence detector 19 or 22 will have an output. Gate 26 then opens and digital counts are supplied to the two counters, the 315° count in counter 17 being increased by 1° with receipt of each clock count and the 315° count in counter 21 being decreased by one degree with the receipt of each clock count. After thirty counts pass through gate 26 into the system, counter 17 will indicate a count of 345° and counter 21 will indicate 285°. Detectors 19 and 22 will still not have detected any coincidence or equality between their respective inputs and consequently neither will have produced a coincidence output. After thirty counts, however, counter 31 will have reached its maximum count and produced an output which energizes OR gate 32 with the resultant closing of gate 26. Additional counts are therefore not supplied to the system until the next cycle of operation.

At this time sector counter 30 will have supplied register 33 with an accumulated digital count of 30. The accumulated digital count of 30 is shifted into converter 35 causing it to produce its maximum drive rate signal.

Servo 11 will therefore be commanded to operate at its maximum rate towards the desired position.

Figure 4:
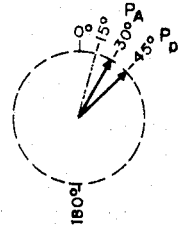

In the example presented in FIG. 4, it is assumed that servo shaft 12 has an actual position of 30° and the desired position once again is 45°. Initially, therefore, counter 17 and 21 will have counts indicative of 30°. Neither coincidence detector will have an output since 30° does not coincide with the desired position of 45°. As counts are received from the clock however the 30° value in counter 17 is gradually increased towards a value of 45°. In fact, after the receipt of fifteen counts from the clock, counter 17 will have a value of 45° and equality detector 19 will respond to the equivalence of its input from counter 17 and its input from source 14 by producing a coincidence or equality output on line 20. OR gate 32 will be activated and accordingly gate 26 will be closed thus stopping any of the counters from advancing. Register 33 will have an accumulated count of 15 which when shifted to converter 35 will cause converter 35 to produce an analog voltage output of a lesser value than its maximum rate voltage. Servo 11 will therefore be commanded to operate at a slower rate since its actual position is approaching its desired position. During each successive cycle after that exemplified in FIG. 4 a lesser and lesser drive rate will be supplied to the servo 11 as it approaches its desired position of 45°. Eventually the actual position will equal the desired position and no drive signal will be supplied to the servo.

In one actual system constructed in accordance with this invention the present position was sampled every twenty-fourth of a second. The particular sampling time chosen would be dependent on the speed capabilities of the servomechanism to be controlled. An extremely slow speed servo naturally would not require as frequent sampling of present position as a high speed servo would. In the system where sampling times were spaced by one twenty-fourth of a second, the clock 25 had a repetition frequency of one million pulses per second. Again, other clock rates could be used depending on the operating parameters of the servomechanism to be controlled.

The operation of the exemplary system may be summarized as follows. If a desired position of a servomechanism is greater than 30° away from the actual position of the servomechanism, the system will command the servomechanism to operate at its maximum speed. When the actual position is within 30° of the desired position the system will generate a lesser drive rate for the servomechanism. This drive rate will become progressively lesser as the difference between the actual and present positions is diminished.

It can therefore be seen that this invention provides a drive rate signal to a servomechanism in response to digital data signals without necessitating the conversion of the digital data signals into analogs. Numeric information may therefore be entered directly into the system of this invention without necessitating conversion into another format.

Although this invention has been described in terms of one particular embodiment thereof, it is not limited thereto, for various changes and modifications could be made by one skilled in the art without departing from the spirit and scope of the invention as defined in the following claims.

What is claimed is:

1. A system for determining the drive rate of a servomechanism for positioning a driven member comprising:
   a source of digital signals representative of the actual position of said driven member;
   a source of digital signals representative of a desired position of said driven member;
   a source of digital counts compatible with said digital signals representative of said actual position;
   first and second shift registers for receiving and storing actual position digital signals from said source of same;

first and second digital counters connected to receive stored digital signals from said first and second registers respectively;

said first and second counters also being provided with digital counts from said source of digital counts;

said first counter being adapted to increase the value of digital signals from said first register in response to the receipt of counts from said source of digital counts;

said second counter being adapted to decrease the value of digital signals from said second register in response to the receipt of counts from said source of digital counts;

first and second digital comparators adapted to compare increased and decreased signals from said first and second counters respectively with signals from said source of desired position digital signals;

said comparators being responsive to equality between their respective compared signals to provide an equality output;

said source of digital counts also being adapted to produce a maximum count signal when a predetermined maximum number of digital counts is reached;

an OR gate having three inputs and an output;

two of said OR gate inputs being connected to receive equality outputs from said first and second comparators respectively and the third of said inputs being connected to receive said maximum count signal from said source of digital counts;

said gate being responsive to produce a blocking signal at its output in response to presence of a signal at any of its inputs;

means for stopping the count of said source of digital counts in response to production of said blocking signal by said OR gate;

a third shift register for receiving and accumulating counts from said source of digital counts;

a digital to analog converter having an input and an output and adapted to produce an alalog voltage at its output proportional to the value of a digital signal at its input;

means for transferring accumulated digital counts from said third shift register to said converter input after said source of digital counts has been stopped;

said convertor output being connected to said servomechanism;

whereby said servomechanism is driven at a rate determined by the magnitude of said stopped count of said source of digital counts.

2. The system of claim 1 wherein:

said servomechanism is of the rotational type and said actual position, desired position and digital count represent angular rotational measurements in degrees;

said predetermined maximum number of digital counts being representative of 30°.

3. The system of claim 1 wherein said source of digital signals representative of said actual position of said driven member is adapted to produce a new digital signal representative of actual position at a periodic rate.

4. The system of claim 3 wherein said system includes:

means for cycling said system for producing a new determination of drive rate in response to production of a new signal representative of actual position by said source of same.

References Cited

UNITED STATES PATENTS 3,172,026  3/1965  Schuman.
3,323,030  5/1967  Inaba et al.

BENJAMIN DOBECK, *Primary Examiner.*

U.S. Cl. X.R.

318—162